(12) United States Patent
Sakamoto

(10) Patent No.: US 8,004,724 B2
(45) Date of Patent: Aug. 23, 2011

(54) METHOD AND APPARATUS FOR IMAGE READING WITH SYNCHRONIZED READOUT AND LIGHTING CONTROL

(75) Inventor: Masahiro Sakamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1244 days.

(21) Appl. No.: 11/566,785

(22) Filed: Dec. 5, 2006

(65) Prior Publication Data

US 2007/0146813 A1 Jun. 28, 2007

(30) Foreign Application Priority Data

Dec. 5, 2005 (JP) .................................. 2005-351314

(51) Int. Cl.
*H04N 1/36* (2006.01)

(52) U.S. Cl. ........ 358/412; 358/445; 358/461; 358/483; 250/208.1; 318/560

(58) Field of Classification Search .................. 358/446, 358/461, 474, 443, 412, 445
See application file for complete search history.

(56) References Cited

U.S. PATENT DOCUMENTS

| | | | | |
|---|---|---|---|---|
| 3,737,883 A * | 6/1973 | Sordello et al. | ............. | 360/78.11 |
| 4,130,838 A * | 12/1978 | St. John | ........................ | 358/412 |
| 4,706,130 A * | 11/1987 | Yamakawa | .................... | 358/296 |
| 4,821,099 A | 4/1989 | Sakamoto | ..................... | 358/163 |
| 4,827,351 A | 5/1989 | Sakamoto | ..................... | 358/284 |
| 4,953,038 A * | 8/1990 | Schiebel et al. | ............. | 358/471 |
| 5,151,640 A | 9/1992 | Sakamoto | ..................... | 318/696 |
| 5,220,185 A * | 6/1993 | Wada | .............................. | 257/239 |
| 5,278,675 A * | 1/1994 | Kamiyama | .................... | 358/486 |
| 5,371,608 A * | 12/1994 | Muto et al. | ..................... | 358/412 |
| 5,402,249 A | 3/1995 | Koseki et al. | ................. | 358/446 |
| 5,517,331 A * | 5/1996 | Murai et al. | .................. | 358/486 |
| 6,476,370 B1 * | 11/2002 | Suzuki et al. | ............. | 250/208.1 |
| 6,600,286 B2 * | 7/2003 | Tanaka et al. | ................. | 318/560 |
| 6,972,876 B2 * | 12/2005 | Yokochi | ........................ | 358/471 |
| 7,121,749 B2 * | 10/2006 | Morikawa et al. | ............ | 400/283 |
| 7,307,754 B2 * | 12/2007 | Motoyama et al. | ........... | 358/412 |
| 7,605,953 B2 * | 10/2009 | Crooker et al. | ............... | 358/474 |

FOREIGN PATENT DOCUMENTS

| | | |
|---|---|---|
| JP | 63-287167 | 11/1988 |
| JP | 5-183580 | 7/1993 |
| JP | 6-105135 | 4/1994 |
| JP | 8-228267 | 9/1996 |

* cited by examiner

*Primary Examiner* — Twyler L Haskins
*Assistant Examiner* — Dennis Dicker
(74) *Attorney, Agent, or Firm* — Fitzpatrick, Cella, Harper & Scinto

(57) ABSTRACT

An image reading apparatus for reading an image on an original includes a reading unit for optically reading the image of the original while the image is illuminated by light from a light source; a moving unit for moving the reading unit relative to the original; a position signal generator for outputting a position signal in accordance with movement of the reading unit by the moving unit; a lighting control unit for controlling the light source for lighting for a first period in synchronism with the position signal; and an output control unit for generating a control signal for outputting an image signal corresponding to the image read by the reading unit after the light source lights for the first period and for outputting the image signal for a second period in synchronism with the control signal.

16 Claims, 10 Drawing Sheets

METHOD AND APPARATUS FOR IMAGE READING WITH SYNCHRONIZED READOUT AND LIGHTING CONTROL

FIELD OF THE INVENTION

The present invention relates to an image reading apparatus and an image reading method, more particularly to an image reading apparatus and image reading method for reading optically an image of a sheet-like recording material by a linear image sensor.

DESCRIPTION OF THE RELATED ART

A CCD line sensor is used in conventional image reading apparatuses (Japanese Laid-open Patent Application Hei 6-105135, for example). In a known image reading apparatus, a position sensor is disposed adjacent the moving image original for the purpose of improving the positional accuracy, in reading, of the linear image sensor, and the reading timing of the image sensor is controlled by an output signal of the position sensor (Japanese Laid-open Patent Application Sho 63-287167, for example).

In another known apparatus, a rotary encoder outputs a pick-up pulse for each movement of a predetermined distance in the direction of mechanical movement of a CCD line sensor, and the photoelectric conversion start signals are generated forcedly in response to the outputs (Japanese Patent Application Publication Hei 3-70213, for example).

In a further example of known apparatus, with respect to the moving direction of the line sensor, the reading speed of the image original is measured, and a horizontal synchronizing signal for the line sensor is generated, wherein in response to drive of the motor for moving the line sensor relative to the image original, the horizontal synchronizing signal is resynchronized (Japanese Patent No. 3585976, for example).

However, the conventional examples involve problems.

Japanese Laid-open Patent Application Sho 63-287167 discloses that when a position sensor detects the movement corresponding to 1 dot pitch, the image data accumulated in the line sensor is transferred. However, the positional accuracy of the reading line deteriorates since the position sensor output is not synchronized with the accumulation timing of the line sensor.

In the apparatus disclosed in Japanese Patent Application Publication Hei 3-70213, the photoelectric conversion signal for the image sensor is forcedly generated by the output signal of the rotary encoder to improve the positional accuracy. However, with this structure, the photoelectric conversion signal for the image sensor by the output signal of the rotary encoder cannot be generated during the output period of the reading analog image signal, and therefore, the synchronization with the rotary encoder sensor output is not possible. Therefore, the normal operation is not possible if the output period of the rotary encoder is larger than the sum of the photoelectric conversion period and the image signal output period, and for this reason, the high speed reading is possible. In addition, when the photoelectric conversion signal is forcedly generated, an electric charge overflow in the charge transfer portion in the image sensor and/or a too high voltage output may occur, and the circuit operation thereafter may be influenced.

In Japanese Patent No. 3585976, a continuous reading operation is possible in synchronism with the main-scanning synchronizing signal by resynchronizing the horizontal synchronizing signal for only the first line of reading. However, the synchronization is only for the start line, it is not possible to remove the variation in the read position resulting from the variation in the drive speed during the continuous line reading operation.

In any of such systems, the main-scanning synchronizing signal period during reading operation has to be constant, and if it varies, the positive reading is not effected.

SUMMARY OF THE INVENTION

According to an aspect of the present invention, there is provided an image reading apparatus for reading an image on an original, comprising reading means for optically reading the image of the original while the image is illuminated by light from a light source; moving means for moving said reading means relative to the original; position signal generating means for outputting a position signal in accordance with movement of said reading means by said moving means; lighting control means for controlling said light source for lighting for a first period in synchronism with the position signal; output control means for generating a control signal for outputting an image signal corresponding to the image read by said reading means after said light source lights for the first period and for outputting the image signal for a second period in synchronism with the control signal.

According to another aspect of the present invention, there is provided an image reading apparatus for reading an image on an original, comprising reading means for optically reading the image of the original while the image is illuminated by light from a light source, said reading means including a photoelectric conversion element array in which photoelectric conversion elements are arranged and a shift register; moving means for moving said reading means relative to the original; position signal generating means for outputting a position signal in accordance with movement of said reading means by said moving means; lighting control means for controlling said light source for lighting for a first period in synchronism with the position signal; output control means for generating timing signal for transferring electric charge accumulated in said photoelectric conversion element to said shift register after said light source lights for the first period, and for outputting the electric charge from said reading means through said shift register for a second period after the generation of the timing signal.

According to a further aspect of the present invention, there is provided an image reading apparatus for reading an image on an original, comprising reading means for optically reading the image of the original while the image is illuminated by light from a light source, said reading means including a photoelectric conversion element array in which photoelectric conversion elements are arranged and a shift register; moving means for moving said reading means relative to the original; position signal generating means for outputting a position signal in accordance with movement of said reading means by said moving means; permission signal control means for generating a permission signal for permitting, a first period, accumulation of electric charge in said photoelectric conversion element in synchronism with the position signal in a state that light source is on;

output control means for generating a timing signal for transferring the electric charge accumulated in said photoelectric conversion element to said shift register after the permission signal for a first period, and for outputting the electric charge from said reading means through said shift register for a second period after the generation of the timing signal.

According to a further aspect of the present invention, there is provided an image reading method using a reading portion including a photoelectric conversion element array in which photoelectric conversion elements are arranged and a shift register, wherein a image of the original is optically read while the image is illuminated by light from a light source, said reading method comprising a moving step of moving said reading portion relative to the original; a position signal generation step of outputting a position signal in accordance with movement, by said moving step, of said reading portion; lighting control step of lighting said light source for a first period in synchronism with said position signal;

output control step of generating timing signal for transferring electric charge accumulated in said photoelectric conversion element to said shift register after said light source lights for the first period, and of outputting the electric charge from said reading means through said shift register for a second period after the generation of the timing signal.

According to a further aspect of the present invention, there is provided an image reading method using a reading portion including a photoelectric conversion element array in which photoelectric conversion elements are arranged and a shift register, wherein a image of the original is optically read while the image is illuminated by light from a light source, said reading method comprising a moving step of moving said reading portion relative to the original; a position signal generation step of outputting a position signal in accordance with movement, by said moving step, of said reading portion; permission signal control step of generating a permission signal for permitting, a first period, accumulation of electric charge in said photoelectric conversion element in synchronism with the position signal in a state that light source is on; output control step of generating a timing signal for transferring the electric charge accumulated in said photoelectric conversion element to said shift register after the permission signal for a first period, and of outputting the electric charge from said reading means through said shift register for a second period after the generation of the timing signal.

These and other objects, features and advantages of the present invention will become more apparent upon a consideration of the following description of the preferred embodiments of the present invention taken in conjunction with the accompanying drawings.

DESCRIPTION OF THE EMBODIMENTS

The preferred embodiments of the present invention will be described in conjunction with the accompanying drawings.

Figure 1:
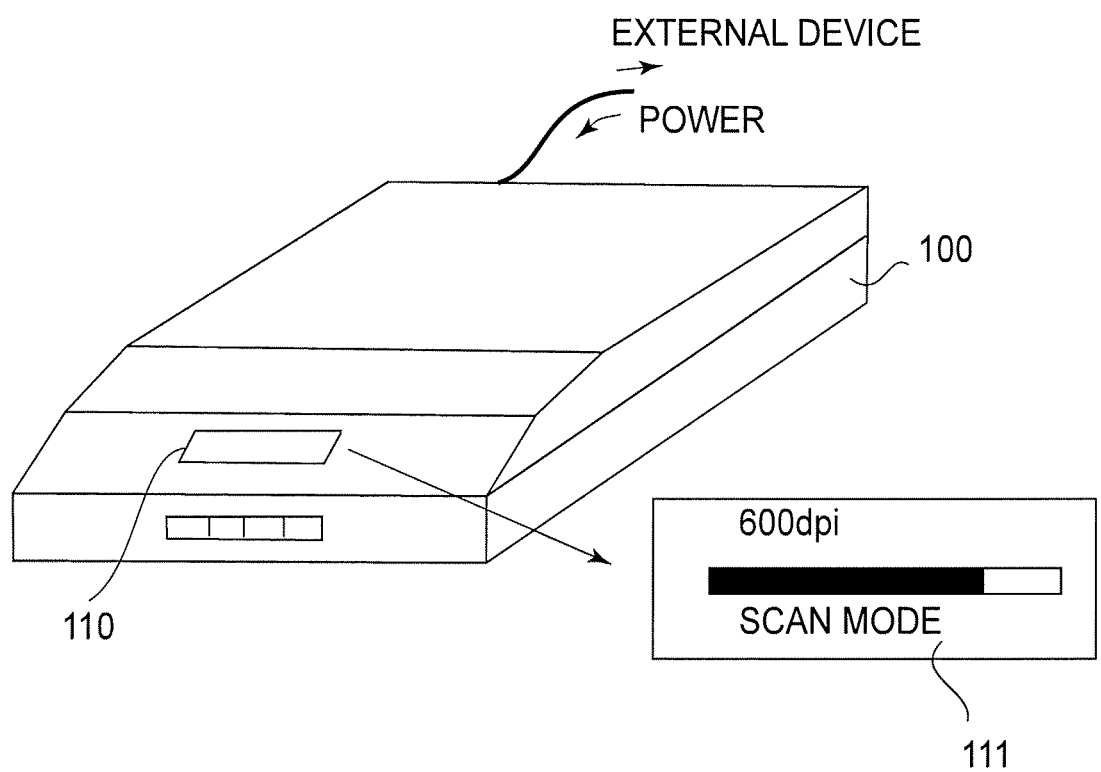
FIG. 1 is a perspective view of an outer appearance of an image reading apparatus of flat bed type according to an exemplary embodiment of the present invention.

FIG. 1 is a perspective view of an outer appearance of an image reading apparatus 100 (optical scanner) of a flat bed type which is an exemplary embodiment of the present invention. As shown in FIG. 1, the image reading apparatus comprises an LCD 110 provided with a back light, and during image reading operation, the back light of the LCD 110 is turn on, and simple letters, information and/or an image can be displayed. In this embodiment, the LCD display screen 111 displays a reading resolution, a scanning mode, and an indicator for progress of the reading operation. The image reading apparatus 100 is connected with an external device such as a host computer (host) through USB interface, and the image reading apparatus is supplied with the external device through the USB interface. An exemplary host is a personal computer.

The present invention is applicable not only to the flat bed type image reading apparatus as shown in FIG. 1 but also to a scanner incorporated in a multi-function printer having functions of printer and/or facsimile machine.

Figure 2:
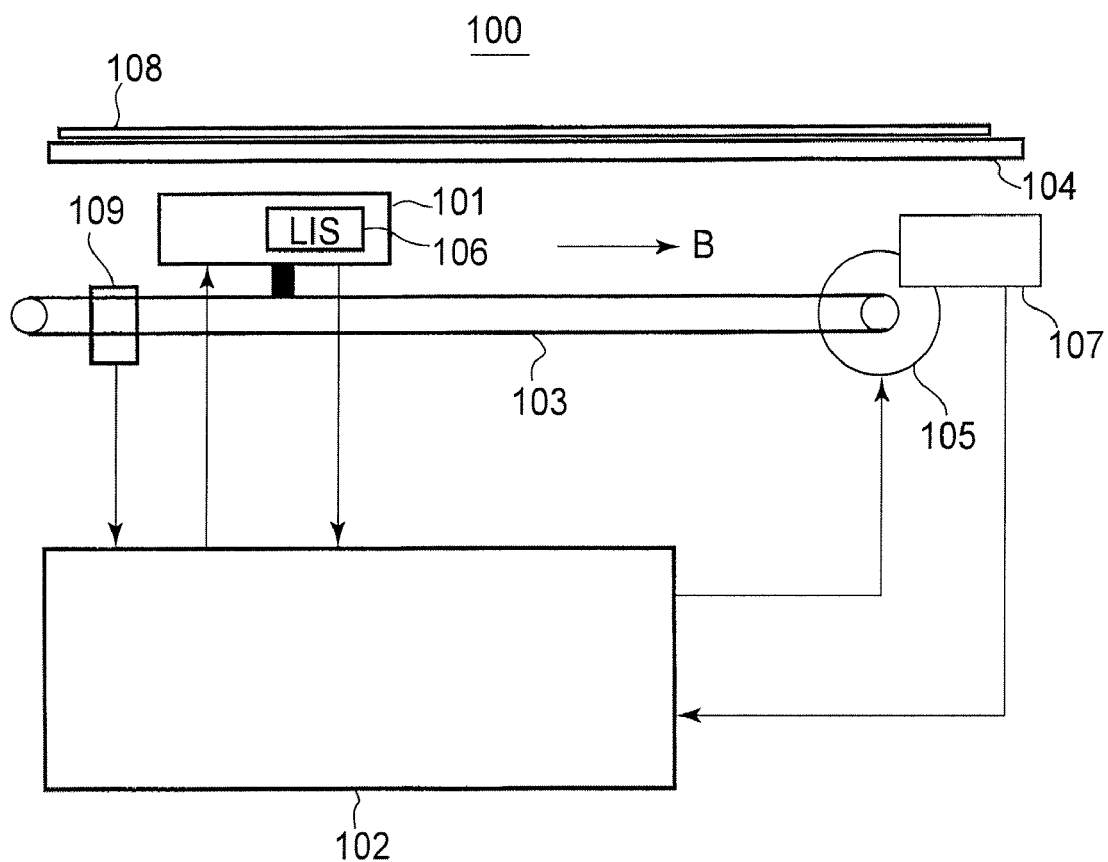
FIG. 2 is a sectional side elevation illustrating an internal structure of the image reading apparatus of FIG. 1.

FIG. 2 is a sectional side elevation illustrating the internal structure of the image reading apparatus 100 FIG. 1.

As shown in FIG. 2, the image reading apparatus 100 comprises an optical unit 101, a circuit board 102 electrically connected with the optical unit 101, a belt 103 carrying the optical unit 101 to scanningly move it in a direction of arrow B, and an original supporting platen glass 104 for placing an image original 108. The optical unit 101 includes a linear image sensor (LIS) 106 for illuminating the image original 108 with light and for receiving reflected light and converting the light signal to an electric signal.

The belt 103 is rotated by a DC motor 105. A rotary encoder (unshown) is mounted on a rotation shaft of the DC motor 105, and the rotary encoder sensor 107 outputs a position signal of rotary encoder. On the basis of the position signal, the position of the LIS 206 is detected.

A home position sensor 109 is provided at the end of the scanning path of the optical unit 101 and outputs a home position signal upon the optical unit 101 reaching a predetermined home position (HP).

The rotational speed of the DC motor 105 is controlled by a voltage or current supplied through the circuit board 102. The position signal of the rotary encoder outputted from the rotary encoder sensor 106 is transferred to the circuit board 102.

In the image reading operation, the optical unit 101 scans the image original 108 placed on the original supporting platen glass 104 in the direction of the arrow B to read the image on the image original 108.

Figure 3:
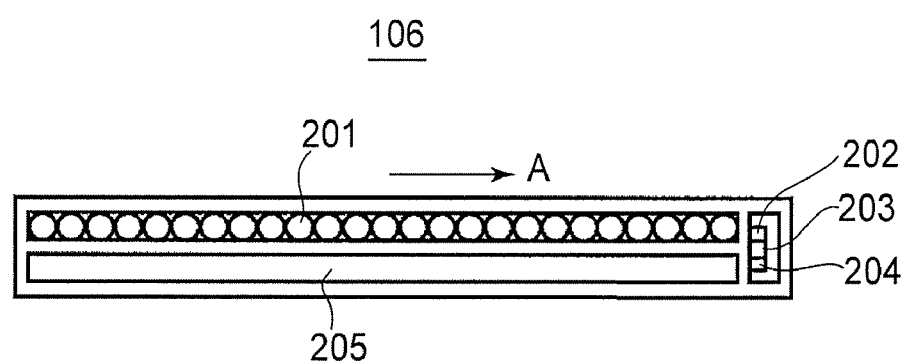
FIG. 3 is a sectional side elevation illustrating a detail structure of a linear image sensor unit.

FIG. 3 is a sectional side elevation illustrating in detail the structure of the linear image sensor (LIS) 106.

As shown in FIG. 3, the LIS 206 comprises a red color LED 202 for emitting R (red) color light, a green color LED 203 for emitting G (green) color light and a blue color LED 204 for emitting B (blue) color light. During the original reading operation, the LEDs are actuated for each line with time-sharing, and the emitted light is uniformly projected through a light guide couple 205 onto the original, and the light reflected thereby is condensed for each pixel by SELFOC lens 201, and the light is converted to an electric signal by a photoelectric conversion element. Thus, image signals of one line comprising color signals indicative of RGB color components. By moving the LIS unit in the sub-scan direction, the whole surface of the original is read.

The linear image sensor LIS 206 is provided with a diode array (photoelectric conversion element) and a shift register output portion. The diode array includes a photo-diode and a charge storage portion.

Figure 15:
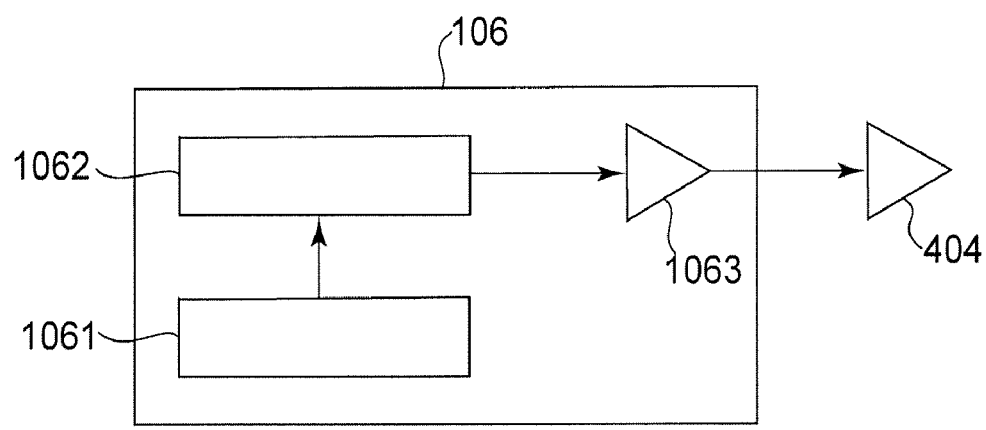
FIG. 15 is a function block diagram of a linear image sensor unit.

Referring to FIG. 15, there is shown a process block diagram with respect to the R (red) reflected light. Designated by 1061 is the diode array; and 1062 is the shift register; and 1063 is an output portion. The output portion 1063 outputs the signal into an amplifier (AMP) 404. The same applies to the G (green) color and to the B (blue) color, and therefore, the detailed description thereof will be omitted.

The SELFOC lens 201 includes cells which are reception arranged in the direction of arrow A which is the main scan direction. The main scan direction and the sub-scan direction are orthogonal to each other. In FIG. 2, the main scan direction is perpendicular to the sheet of the drawing.

Figure 4:
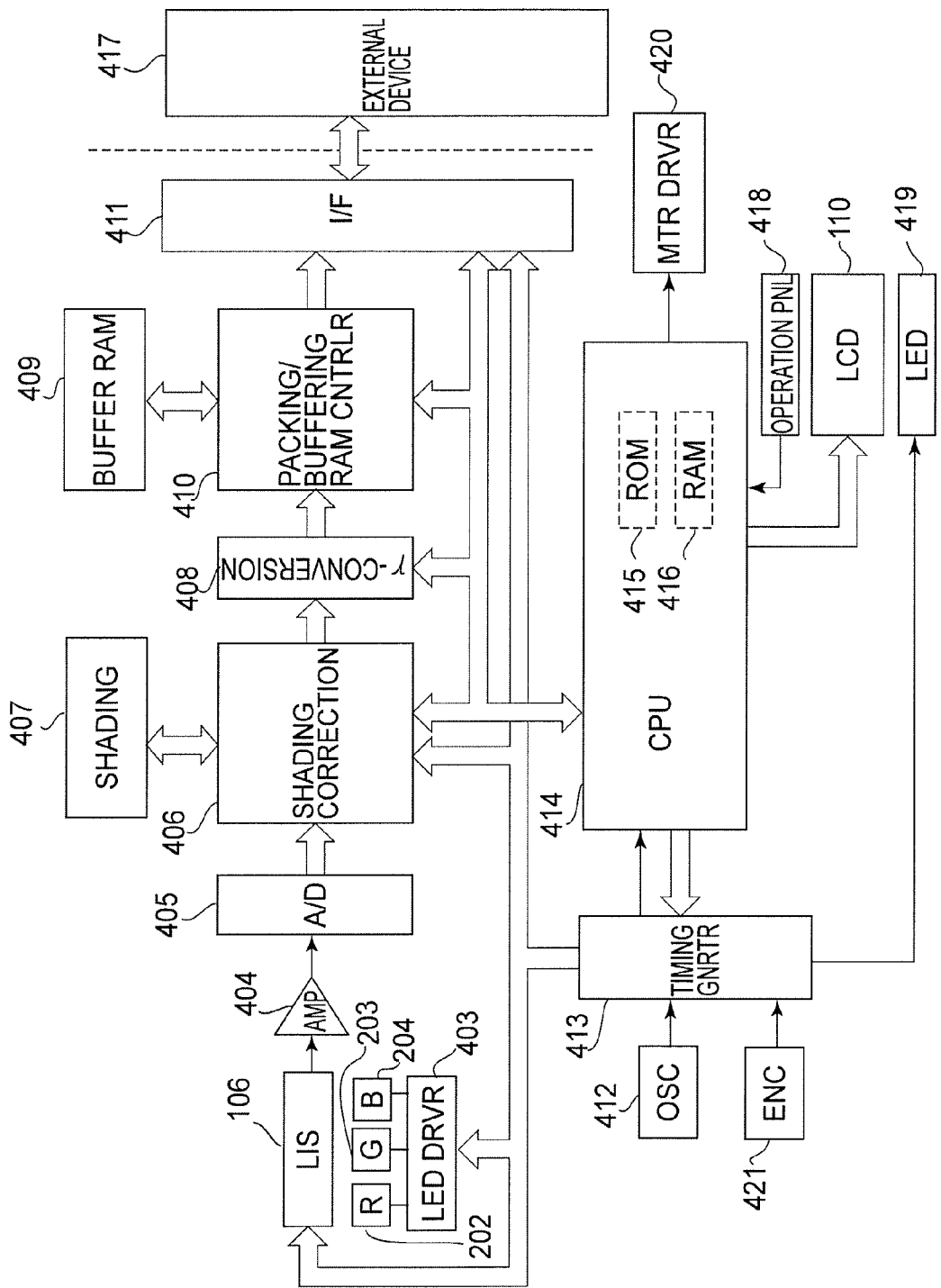
FIG. 4 is a block diagram illustrating a control structure of the image reading apparatus of FIG. 1.

FIG. 4 is a block diagram illustrating a control circuit of the image reading apparatus.

The same reference numerals as in FIG. 1-FIG. 3 are assigned to the elements having the corresponding functions in FIG. 4, and the detailed description thereof is omitted for simplicity.

LIS 106 reads, for each line, the color image sequentially by RGB lines while switching the LEDs 202-204 by the driving circuit 403. The LEDs 202-204 are capable of changing the projection light quantity. The amplifier (AMP) 404 amplifies a signal outputted from the LIS 206, and the A/D converter 405 A/D-converts the amplified electric signal into 16 bit digital image data for each pixel, for example, and outputs the digital image data.

A shading RAM 407 reads a standard white color plate (unshown) which is stuck on the back side of an index plate (unshown) stuck on the original glass 105, and stores the data for shading correcting operation. A shading correction circuit 406 imparts a shading correction process on the image data outputted from the A/D converter 405 on the basis of the data stored in the shading RAM 407. A γ conversion circuit 408 imparts γ conversion on the image data having been subjected to the shading correcting operation in accordance with the γ curve preset in the host device.

A buffer RAM 410 is a RAM for temporarily storing the image data to time the communication with the host device to the actual reading operation. A packing/buffering RAM control circuit 411 carries out a packing process to meet the image formation outputting mode preset by the host device (binary, 8 bit gray, 24 bit color (8 bits for each of RGB), 48 bit color (16 bits for each of RGB)). The image data having been subjected to the packing process is written in a buffer RAM 410, and the image data are read out of the buffer RAM 410 into an interface control circuit 411.

The interface control circuit 411 exchanges control data with and outputs the image data to the host device (external device 417).

The series of processing operations are controlled by the CPU 414. In the control operation thereof, the process programs stored in the ROM 415 are read by the CPU 414 and are executed in the operation area of the RAM 416.

Referring to FIG. 4, designated by 412 is a reference signal oscillator (OSC) such as an crystal oscillator; and 413 is a timing signal generating circuit for generating various timing signals which function as references provided by dividing a frequency of the output of the reference signal transmitter 412 in accordance with setting of the CPU 414. Designated by 421 is a rotary encoder which outputs signals in accordance with movement of the LIS 206. The signals are inputted to the timing signal generating circuit 413. The timing signal generating circuit 413 generates output timing of a main-scanning synchronizing signal, output timing of a reading light source actuation signal (LEDR), output timing of an analog image signal (AIMG) and so on.

Designated by 417 is an operation panel including operation buttons, the output signal is connected with an input port of the CPU 414. Designated by 419 is an LED functioning as a back light source of the LCD 110 and actuated by a lighting signal outputted from the timing signal generating circuit 413. Designated by 420 is a motor driver for controlling the DC motor 105 on the basis of the instructions from the CPU 414.

An image reading operation of the image reading apparatus having the above-described structures will be described. For simplicity of explanation, the description will be made as to the execution of image reading with one LED lit on. In this embodiment, the image reading operation is controlled in synchronism with the signal pulses from the rotary encoder sensor 107.

Figure 5:
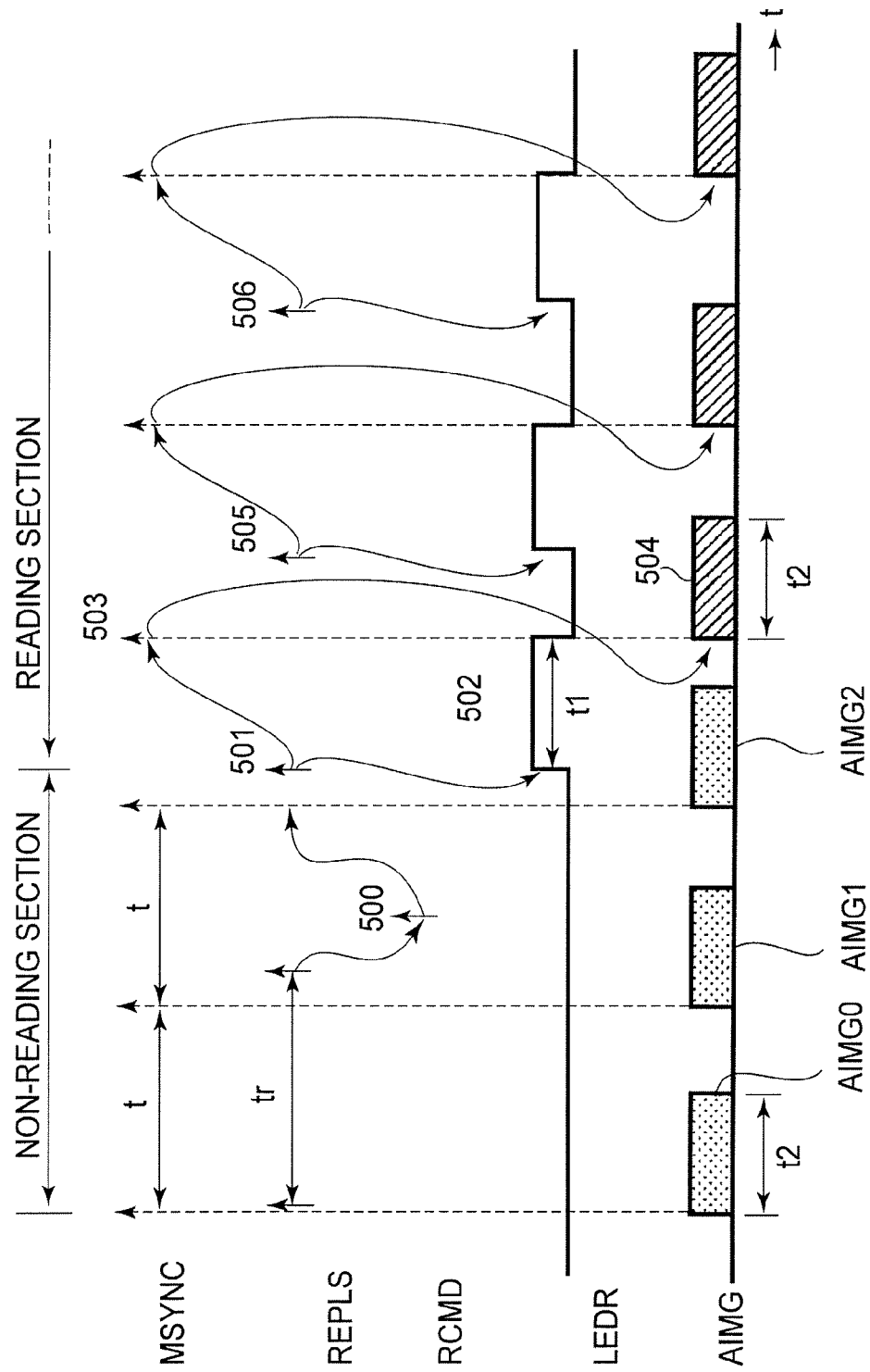
FIG. 5 is a time chart of various signals for image reading synchronized with an output of a rotary encoder sensor.

FIG. 5 is a time chart of various signals in the image reading operation. In FIG. 5, the time elapses from left to right, and there is shown the situation in the transition from the non-reading state to the reading state. For example, LIS 206 is in the non-reading state in the acceleration control region, and changes to the reading state when the reading means reaches the constant speed control region.

When the CPU 414 does not execute the image reading operation, as shown in FIG. 5, it outputs main-scanning synchronizing signals (MSYNC) at predetermined intervals. On the other hand, the LIS 206 accumulates the optical signals produced in the period of the main-scanning synchronizing signal and converts them to analog electric signals, and outputs, during the next period of the main-scanning synchronizing signal, the accumulated charge as analog image signals (AIMG) of the one scan. For example, the diode array 1061 accumulates the charge from the immediately previous MSYNC output timing to the subsequent MSYNC output timing. When the MSYNC of the timing 503 is outputted in the reading operation section, the diode array 1061 outputs the accumulated charge to the register 1062. The charge outputted to the register 1062 starts to output (transfer) to the amplifier 404 in synchronism with the MSYNC. In the output process, it is outputted to the amplifier 404 through an output portion 1063 on the basis of the clock signals for the output operation. The analog image signal (AIMG) outputted at the timing 504 corresponds to the timing 502 of LEDR. When the reading operation is not executed, the LED 202-204 of the light source is turned off. As indicated by half-tone dot meshing (analog image signal (AIMG)) in FIG. 5, the analog image signal outputted from the LIS 206 (AIMG0, AIMG1, AIMG2) is substantially zero (full black).

The CPU 414 controls the DC motor 105 through the motor driver 420 to move the LIS 206 relative to the image original 108. Here, prior to the image reading operation, the signal pulses from the rotary encoder sensor 107 are counted upon detection of the signals from the home position sensor 109. When the count of the signal pulse from the rotary encoder sensor 107 after the start of counting reaches a predetermined value (that is, the predetermined read starting position is reached), the reading operation starts.

As shown in FIG. 5, when, for example, the count of the pulse signal (REPLS) reaches the predetermined value immediately before the timing 501, a reading command (RCMD) is issued at timing 500. Then, the image reading operation starts at timing 501, the reading light source actuation signal (LEDR) is outputted for the predetermined period (t1) at timing 502 in synchronism with the pulse signal (REPLS), and thereafter, the main-scanning synchronizing signal (MSYNC) is outputted at timing 503. Thus, the CPU 414 is triggered by the pulse signal (REPLS), and effects the control operation such that at time t1 thereafter, it outputs the main-scanning synchronizing signal (MSYNC). Subsequently to the output of the main-scanning synchronizing signal (MSYNC) 503, the analog image signal (AIMG) is outputted for period (t2) at timing 504. In other words, the analog image signal (AIMG) is outputted in synchronism with the output of the main-scanning synchronizing signal (MSYNC) 503. More description will be made referring to FIG. 15. The retained charge is outputted through the output portion 1063 to the register 1062 for period (t2) at the timing 504. Subsequently, the reading operations are carried out continuously at the output timing 505 and 506 of the pulse signals (REPLS) in the similar manner. In order to effect the continuous operation, the period (t) of the main-scanning synchronizing signal (MSYNC) normally satisfies t≧t1 and t≧t2 at least in the image reading operation section. In addition, tr>t1 is satisfied where tr is a period of REPLS. Furthermore, t1 and t2 satisfy t1>t2. This is because when the time interval between the immediately previous pulse signal (REPLS) and the subsequent pulse signal (REPLS) is t1, for example, the content of the analog image signal (AIMG) held in the register 1602 is changed unless t1>t2 is satisfied. Further, this is because prior to completion of the output process from the register 1602 retaining the analog image signal (AIMG), the main-scanning synchronizing signal (MSYNC) triggers, and the charge is outputted to the register 1062 from the diode array 1061.

Figure 6:
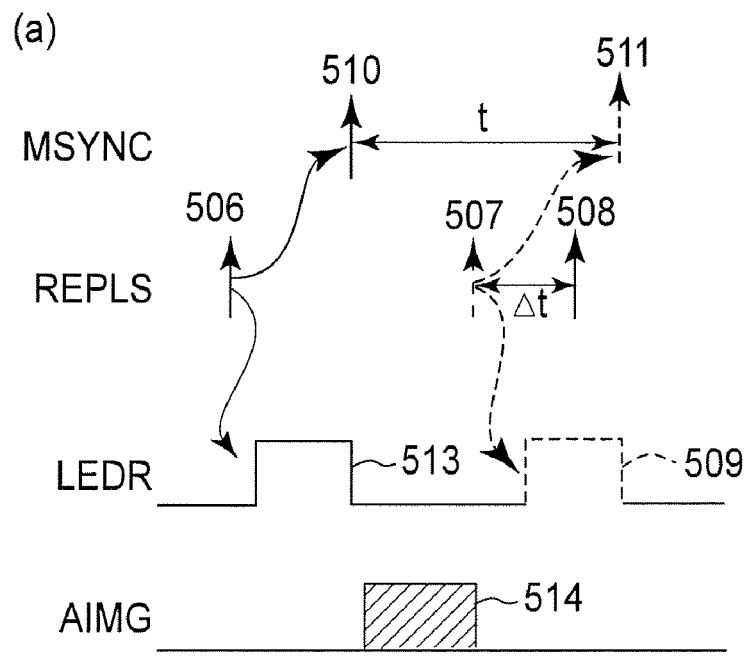
FIG. 6 is a time chart of various signals for image reading in the case that period of the rotary encoder sensor output is long.
Figure 6:
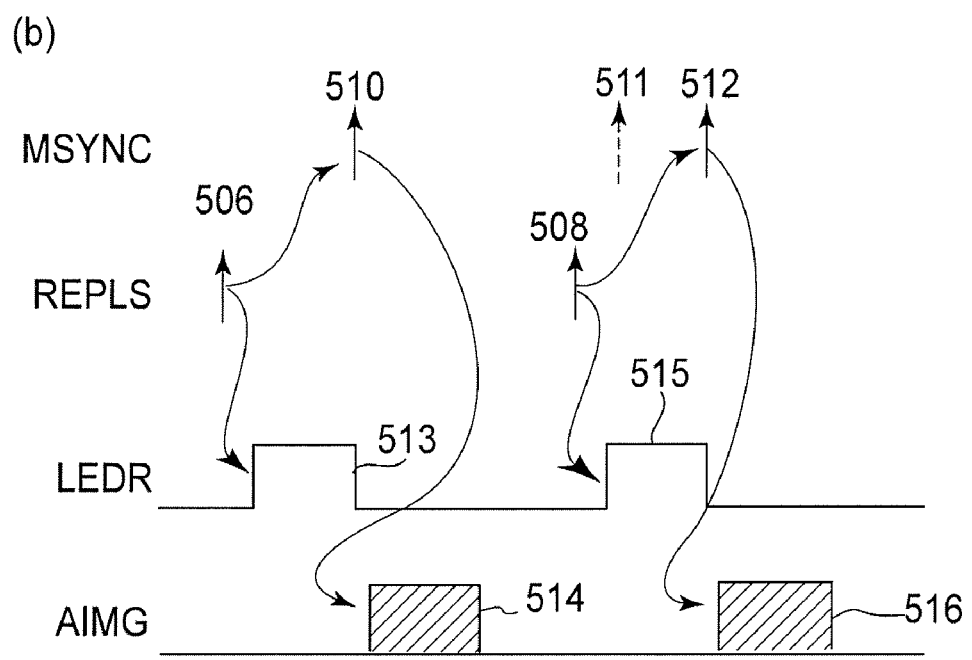

FIG. 6 is a time chart of the various signals of the image reading operation subsequent to the operation of FIG. 5.

In FIG. 6, the same reference characters are assigned to the same signals and timing as in FIG. 5.

In FIG. 6, (a) deals with the case of a long interval between output pulses (REPLS). In this case, the time interval between the immediately previous output timing 506 of the output pulse (REPLS) and the subsequent output timing 508 of the output pulse (REPLS) is longer than the period (t) of the main-scanning synchronizing signal (MSYNC) in the non-reading operation section. Here, designated by 507 is the timing with which the time from the output timing 506 of the previous output pulse (REPLS) to the subsequent output timing of the output pulse (REPLS) is equal to the period (t) of the main-scanning synchronizing signal (MSYNC) in the non-reading operation section. The timing at which the output pulse (REPLS) is actually outputted is timing 508 which is later by f¢t. Therefore, the reading light source actuation signal (LEDR) outputted at the timing 515 shown in (b) of FIG. 6 is outputted with delay of f¢t from the timing 509 shown by broken lines in (a) of FIG. 6.

Therefore, as shown in (b) of FIG. 6, the next output pulse (REPLS) from the rotary encoder sensor 107 is outputted at the timing 508, and in synchronism with the timing, the reading light source actuation signal (LEDR) and the main-scanning synchronizing signal (MSYNC) are outputted. And, in synchronism with the main-scanning synchronizing signal (MSYNC) outputted at the timing 512, the analog image signal (AIMG) is outputted at the timing 516. As has been described in conjunction with (a) of FIG. 6, the output 508 of the REPLS is delayed by f¢t from the timing 507, and therefore, the timing 512 of the main-scanning synchronizing signal (MSYNC) delays by f¢t from the timing 511.

In this manner, when the period of the output pulse (REPLS) from the rotary encoder sensor 107 is long, it is different from that in the non-reading operation section, and the period of the main-scanning synchronizing signal for the analog image signal output varies as shown by the timing 510 and the timing 512.

On the contrary, there is a possibility that period of the output pulse signal (REPLS) from the rotary encoder sensor 107 is short due to the influence of the servo control for the DC motor. In such a case, as will be understood from the timing 505 in FIG. 5, even if the pulse signal (REPLS) overlaps with the output period of the analog image signal (AIMG), no main-scanning synchronizing signal (MSYNC) is outputted, and therefore, no influence is imparted to the image signal output. Therefore, the output process (t2) of AIMG of the previous MSYNC and the LEDR process the ON period) of the subsequent MSYNC can be carried out concurrently.

On the other hand, with the conventional system, the charge is outputted from the diode array 1061 to the shift register 1062 in synchronism with the pulse signal (REPLS) of the rotary encoder sensor 107. Therefore, when the signal (REPLS) is generated during the output period of the analog image signal (AIMG), the analog image signal (AIMG) from the current signal (REPLS) is outputted at a certain point during the output period. With such a process, the output of the analog image signal (AIMG) for one scanning unit (one scan) is not correct.

In order to output analog image signals (AIMG) of one scan, it is necessary to select the moving speed of the line sensor taking into account that period tr of the output pulse signal (REPLS) may be short.

That is, the period (tr) of the REPLS>the output period (t2) of the effective period (t1) +AIMG of LEDR has to be satisfied by selecting the moving speed of the line sensor. With such a conventional system, it is not possible to concurrently carry out the output process of AIMG from the previous MSYNC and the LEDR process for the subsequent MSYNC.

As has been described in conjunction with FIG. 5, when the count of the pulse signals (REPLS) from the rotary encoder sensor 107 reaches the predetermined value, the read start command (RCMD) is issued internally. When the read start command (RCMD) is issued, the LED of the LIS 206 is turned and kept on for a predetermined period, in accordance with the pulse signal from the rotary encoder sensor, and then, the main-scanning synchronizing signal (MSYNC) is outputted, and the analog image signal (AIMG) is outputted. The analog image signal (AIMG) is amplified by the amplifier (AMP) 404, and the A/D converter 405 receives the amplified electric signal and A/D-converts it to output the 16 bit digital image data for each pixel. The digital image data is subjected to the image processing such as the shading correction, γ conversion or the like, and then is stored in the buffer RAM 409.

The description will be made as to the cyclic period (t) of the main-scanning synchronizing signal (MSYNC) of the LIS 206 during the image reading operation.

As will be understood from FIG. 5 and FIG. 6, the period of the main-scanning synchronizing signal (MSYNC) used during the reading operation changes depending on the signal pulse from the rotary encoder sensor 107 in the range from t1 to t+t1, and the width of the change is approximately equal to t.

Figure 14:
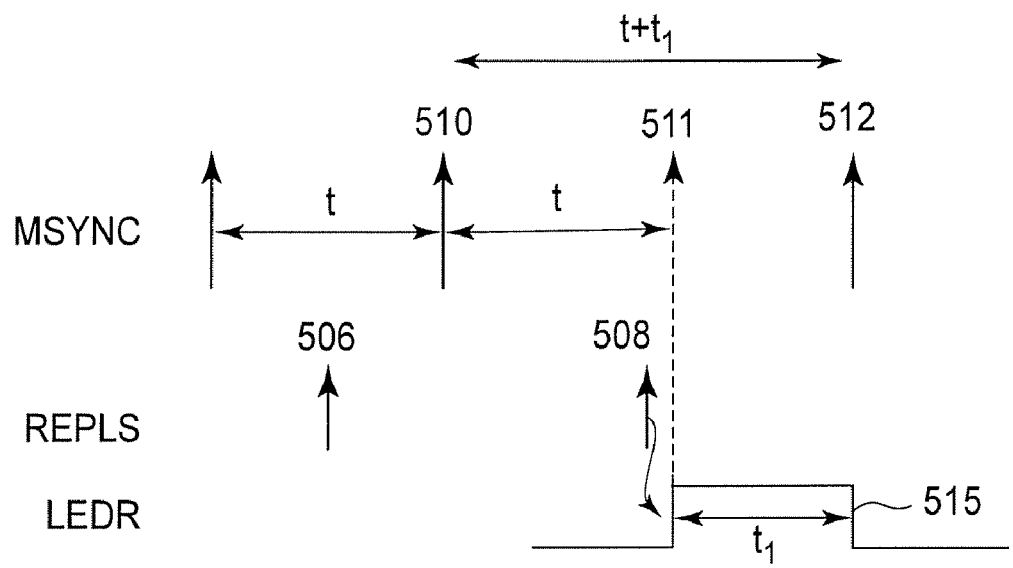
FIG. 14 is a time chart illustrating a variation range of a period of a main-scanning synchronizing signal (MSYNC).

Referring to FIG. 14, the upper limit t+t1 of the variation range will be described.

In FIG. 14, the same reference characters as in FIG. 6 are assigned to the same signals and the same reference characters.

FIG. 14 shows that output timing 508 of the output pulse (REPLS) from the rotary encoder sensor 107 is outputted immediately before the timing 511 which is a period (t) after the timing 510 of the main-scanning synchronizing signal (MSYNC).

In this case, the on-period of the reading light source actuation signal (LEDR) is t1, and therefore, the main-scanning synchronizing signal (MSYNC) is outputted at the timing 512 which is approx. t+t1 after the output timing 510 of the main-scanning synchronizing signal (MSYNC). Thus, the period of the main-scanning synchronizing signal is the maximum when it is outputted immediately before the timing 513 which is a period (t) after the timing 510 of the main-scanning synchronizing signal (MSYNC).

During the image reading operation, the signal is provided by photoelectric conversion of the light reflected by the image original or the light transmitted through the transparent original. Therefore, if the on-period of the light source is constant, the variation in the main-scanning synchronizing signal (MSYNC) in the read image can be mostly ignored.

However, in the case that very high S/N is required as in the case of reading a transparent original, it is desirable that variation in a dark current component of the LIS resulting from the variation of the period of the main-scanning synchronizing signal (MSYNC) is minimized. Then, suppression of the variation in the period of the main-scanning synchronizing signal (MSYNC) is desired. As has been described hereinbefore, since the variation range of the period of the main-scanning synchronizing signal (MSYNC) ranges from t1 to t1+t, the variation width thereof is approximately t.

Fundamentally, it is effective to minimize the period of the main-scanning synchronizing signal for this purpose. From this standpoint, the period (t) of the main-scanning synchronizing signal (MSYNC) in the non-reading operation section is desirably smaller than the on-period (t1) of the reading light source actuation signal (LEDR) during the image reading operation (t<t1). On the other hand, during the reading operation section, the period of the main-scanning synchronizing signal (MSYNC) is longer than the on-period (t1) of the reading light source actuation signal (LEDR) for the purpose of correct reading operation.

As for the period of the output pulse of the encoder during the reading operation section, the time interval (tr) of the output pulse (REPLS) of the encoder and the on-period (t1) of the reading light source actuation signal satisfy t1<tr for the purpose of correct reading operation. The resolution of the slit of the encoder and/or the moving speed of the line sensor is determined to meet these preferabilities.

Furthermore, the analog image signal for one line is read also in the non-reading operation section, and the time necessary for the reading has to be assured. More particularly, $t2 \leq t$ is desirably satisfied.

Figure 7:
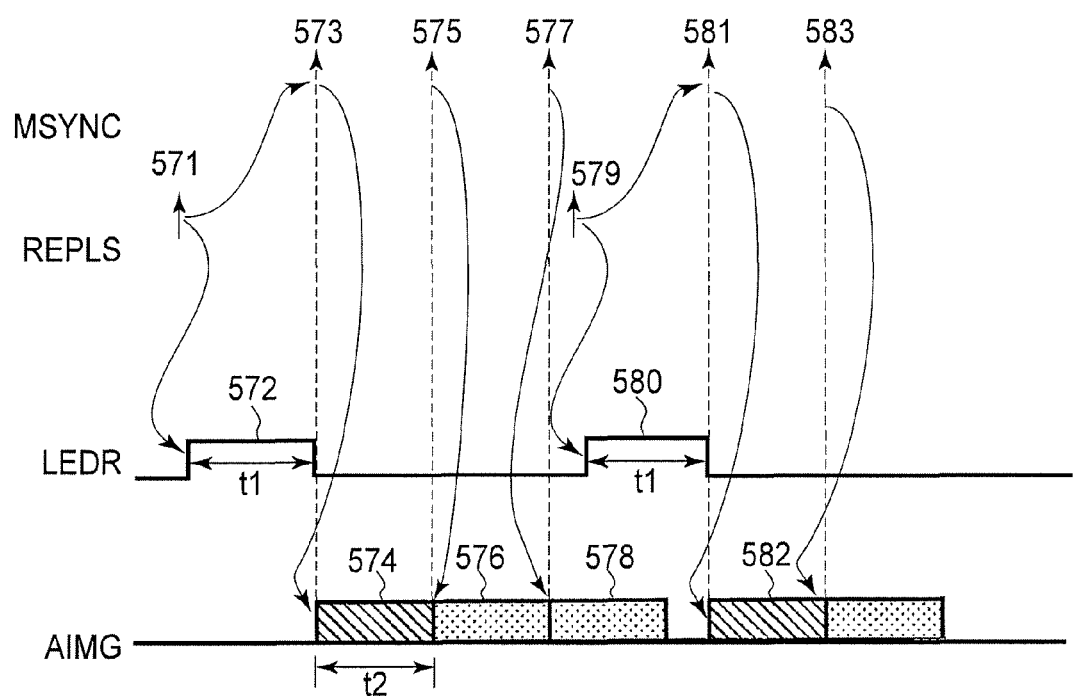
FIG. 7 is a timing chart in the case that non-reading section is provided between reading sections.

FIG. 7 illustrates the case where the period of the main-scanning synchronizing signal (MSYNC) is smaller than the period of the pulse signal (REPLS) from the rotary encoder sensor 107. In FIG. 7, there is a non-reading period between adjacent reading periods. That is, on the basis of the pulse signal (REPLS) 571, the reading light source actuation signal (LEDR) 572 is outputted, and the analog image signal (AIMG) 574 is outputted further. That is, on the basis of the pulse signal (REPLS) 579, the reading light source actuation signal (LEDR) 580 is outputted, and the analog image signal (AIMG) 582 is outputted further. Between the two signal process sequences, the main-scanning synchronizing signal (MSYNC) is outputted twice (575, 577). On the basis of the main-scanning synchronizing signal (MSYNC) 575, the analog image signal (AIMG) 576 is outputted, and on the basis of the main-scanning synchronizing signal (MSYNC) 577, the analog image signal (AIMG) is outputted. In this manner, during the output process operation for the analog image signals (AIMG) 574 and 582, the light source is not actuated, and the read analog image signals (AIMG) 576 and 578 are outputted.

The timing in the constant speed control region of the LIS 206, for example, is shown in FIG. 7. As compared with the moving speed of the LIS 206 in the case of FIG. 5, the moving speed of the LIS 206 is slow in the case of FIG. 7. Therefore, the time duration in which the reading process is executed by the LIS 206 is large. Therefore, the main-scanning synchronizing signal (MSYNC) is outputted independently of the pulse signal (REPLS) during the period in which the pulse signal (REPLS) is not inputted. The control operation for such a signal output is carried out by the timing signal generating circuit 413. For example, when the timing signal generating circuit 413 detects the input of the pulse signal (REPLS) 571, it outputs MSYNC 573 time t1 thereafter. In addition, t ($t2 \leq t$) thereafter, it outputs MSYNC 575, and time t thereafter, it outputs MSYNC 577. When the input of the REPLS 579 is detected, the signal output operations are carried out in the similar order. In this manner, the timing signal generating circuit 413 is capable of outputting the signal of plural periods. When the timing signal generating circuit 413 detects the input of the REPLS 579 prior to the output of the MSYNC 577, the MSYNC 581 is outputted t1 after the REPLS 579 is inputted. More particularly, the output of the MSYNC on the basis of the REPLS is given the priority than the output of the MSYNC of the period t. In other words, the REPLS 579 is inputted before the MSYNC 577 is outputted, the MSYNC 577 is canceled.

Here, as for the main-scanning synchronizing signal (MSYNC), the interval between the MSYNC 573 and the MSYNC 575, the interval between the MSYNC 575 and the MSYNC 577 are determined on the basis of the period (interval between 571 and 579) of the pulse signal (REPLS) and the value of t2. For example, they are determined on the basis of the moving speed of the LIS 206 and t2. With such a control structure, even when the LIS 206 moves at a low speed, the proper reading operation can be effected in synchronism with the position signal from the encoder. The description has been made as to a constant speed example of the sequence operation of FIG. 7, in which the LIS 206 moves at the constant speed, but the example is applicable to the acceleration control region and deceleration control region. Such examples will be described.

Using the number of inputs of the pulse signal (REPLS) and/or the speed information, the period of the pulse signal (REPLS) can be predicted. It will suffice if the output of the main-scanning synchronizing signal (MSYNC) is controlled corresponding to the predicted period. The number of outputs of main-scanning synchronizing signals (MSYNC) of the period t is not limited to two in the case of the sequence operation shown in FIG. 7.

According to the foregoing embodiments, the image signal read by the LIS in synchronism with each of the output of the pulse signal from the rotary encoder used for position detection of the LIS can be obtained in the image reading. By this and even if the speed of the movement of the optical unit containing the LIS varies, the read position is correctly reflected in the reading operation of the image original.

Figure 8:
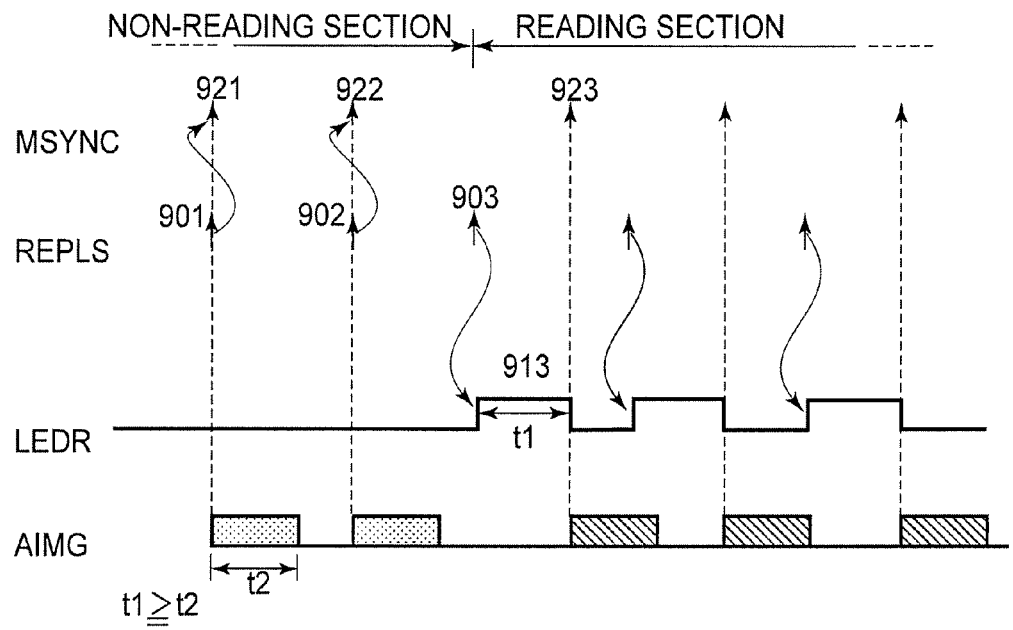
FIG. 8 is a time chart showing generation control of a main-scanning synchronizing signal in the non-reading section during image reading operation.

In the foregoing embodiments, when the image reading operation is not carried out, the main-scanning synchronizing signal (MSYNC) is outputted with a constant period (t), but the present invention is not limited. For example, as shown in FIG. 8, it is a possible alternative that main-scanning synchronizing signal (MSYNC) of the LIS is outputted in accordance with the output of the pulse signal from the rotary encoder sensor always in the non-reading operation section. In FIG. 8 example, the main-scanning synchronizing signal (MSYNC) is outputted at timing 921 and 922 in accordance with timing 921 pulse signal (REPLS) at timing 901 and 902 in the non-reading operation section. At this time, in synchronism with the signal, a dummy analog image signal is outputted. After the pulse signal (REPLS) outputted at the timing 903, the section is the reading operation section, and the reading light source actuation signal (LEDR) is outputted at the timing 913 in response to the pulse signal (REPLS). Subsequently, the main-scanning synchronizing signal (MSYNC) is outputted, and in synchronism with the signal, the analog image signal (AIMG) is outputted.

Figure 9:
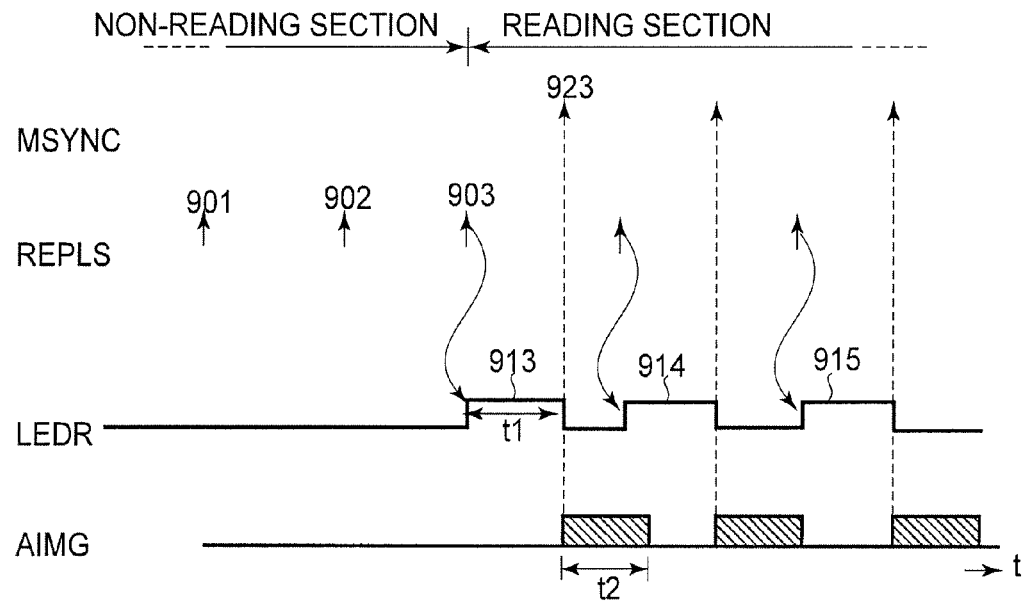
FIG. 9 is a time chart showing another example of generation control of a main-scanning synchronizing signal in the non-reading section during image reading operation.

Or, when the use is made with such a type of LIS that continuous input of the main-scanning synchronizing signal is not required, it is possible that main-scanning synchronizing signal (MSYNC) of the LIS not at all outputted in the non-reading operation section. In FIG. 9, the main-scanning synchronizing signal is not outputted in accordance with the pulse signal (REPLS) at the timing 901 and 902 outputted in the non-reading operation section.

In the foregoing embodiment, the LED is turned and kept on for a constant period in synchronism with the pulse signal from the rotary encoder, and thereafter, the main-scanning synchronizing signal is outputted, the analog image signal is outputted, in the image reading operation. However, the present invention is applicable to the apparatus using a light source not capable of high speed response. In such a case, the use is made with an electronic shutter function of the LIS to effect the exposure period control for the LIS. More particularly, in time charts of FIG. 5-FIG. 9, the reading light source actuation signal (LEDR) is replaced with an electronic shutter enabling (shutter open) signal (SHUTEN) of the LIS. At the reading timing, the SHUTEN signal is in the enabled (permission) state.

An embodiment will be described.

The operation principle of the linear image sensor is such that charge generated in a photo-diode portion as a photoelectric conversion element is accumulated in a charge storage portion for duration of a period of the main-scanning synchronizing signal, and the accumulated charge is transferred to the CCD portion and is shifted for each pixel to be outputted. In a part of image sensor, the charge generated in the photo-diode portion is not accumulated in the charge storage portion, but is discharged. The linear image sensor is provided with a gate circuit for permitting/prohibiting accumulation of the charge. By controlling the length of time in which the gate of the circuit is closed, the amount of accumulation of the charge can be controlled. In the control operation, the SHUTEN signal which will be described hereinafter is used.

Using such a function, the charge storage is effected during only a part of the main-scanning synchronizing signal period. Using such a function, even with the reading apparatus having a light source not capable of high speed response, the exposure period control of the linear image sensor can be carried out, so that similar advantageous effects as in the above-described embodiments can be provided.

Figure 13:
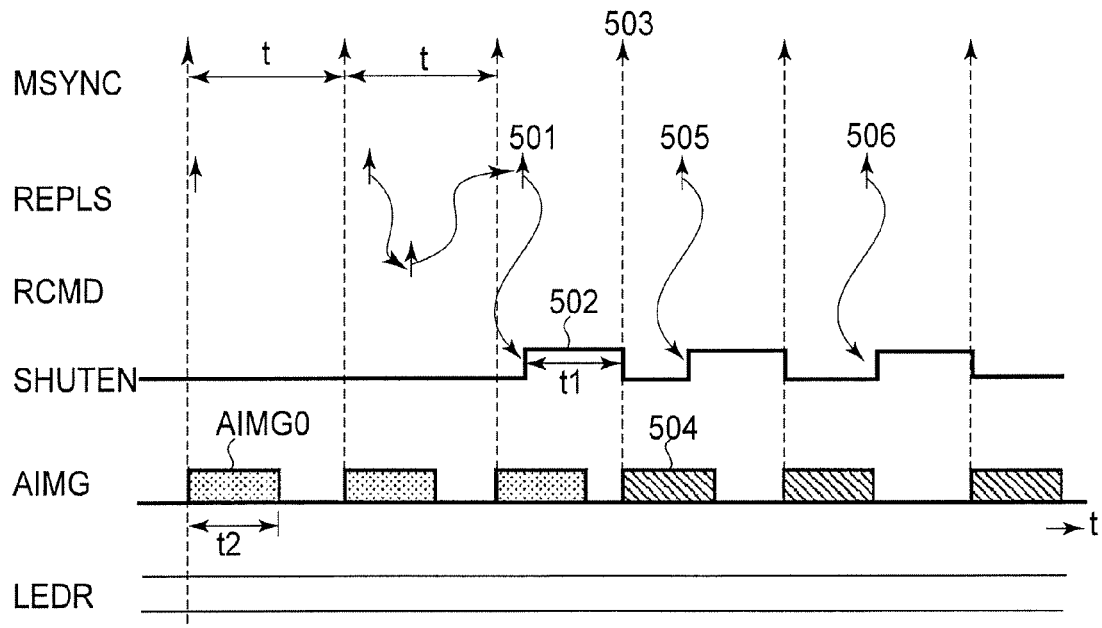
FIG. 13 is a time chart of various signals in another embodiment for image reading synchronized with a rotary encoder sensor output during image reading operation.

Referring to FIG. 13 which is a timing chart, more detailed description will be made. The same reference characters as in FIG. 5 will be assigned to the same signals and the timing in FIG. 13.

The CPU 414 maintains the ON-state (high-level) of the reading light source lighting signal (LEDR) beforehand to stabilize the light output of the light source (the light source is kept on throughout the scanning operation of the linear sensor. When the reading operation is not effected, the main-scanning synchronizing signal (MSYNC) of a constant period is outputted at the predetermined period t to one linear image sensor. The linear image sensor 106 accumulates and converts the optical signal provided by the exposure in the main-scanning synchronizing signal period, and in the subsequent main-scanning synchronizing signal period, the converted signals are outputted as the analog image signal for one main-scan. When the reading operation is not carried out, however, the SHUTEN signal for transferring the charge to the charge storage portion is disabled (prohibition). Therefore, the analog image signal outputted from the linear image sensor is zero (all black data) (AIMG0 indicated by half-tone dots).

The CPU 414 controls the DC motor 105 to cause relative movement between the linear image sensor 106 and the original. Prior to the reading operation, the counting of the sensor output signals of the rotary encoder 107 starts upon the output signal detection of the home position sensor 109. When count of the sensor output signal of the rotary encoder sensor 107 reaches the predetermined value (when the predetermined read starting position is reached, the reading operation starts.

FIG. 13 is a time chart of the rotary encoder sensor output (REPLS) The reading operation starts at the timing 501 of the count of the output signal (REPLS) reaching the predetermined count. The charge is accumulated for a predetermined period (t1) at the timing of the signal (SHUTEN) for accumulating the charge in synchronism with the timing 501. Thereafter, the main-scanning synchronizing signal (MSYNC) is outputted at the timing 503, and subsequently, the analog image signal (AIMG) is outputted at the timing 504. Similarly, the reading operation for respective lines is carried out continuously in accordance with the outputs of the REPLS at the timing 505 and 506.

The above-described control is applicable to the case that three LEDs are provided as the reading light source, and the LEDs switched in turn (time division control) to read the color image as shown in FIG. 3 and FIG. 4.

Figure 10:
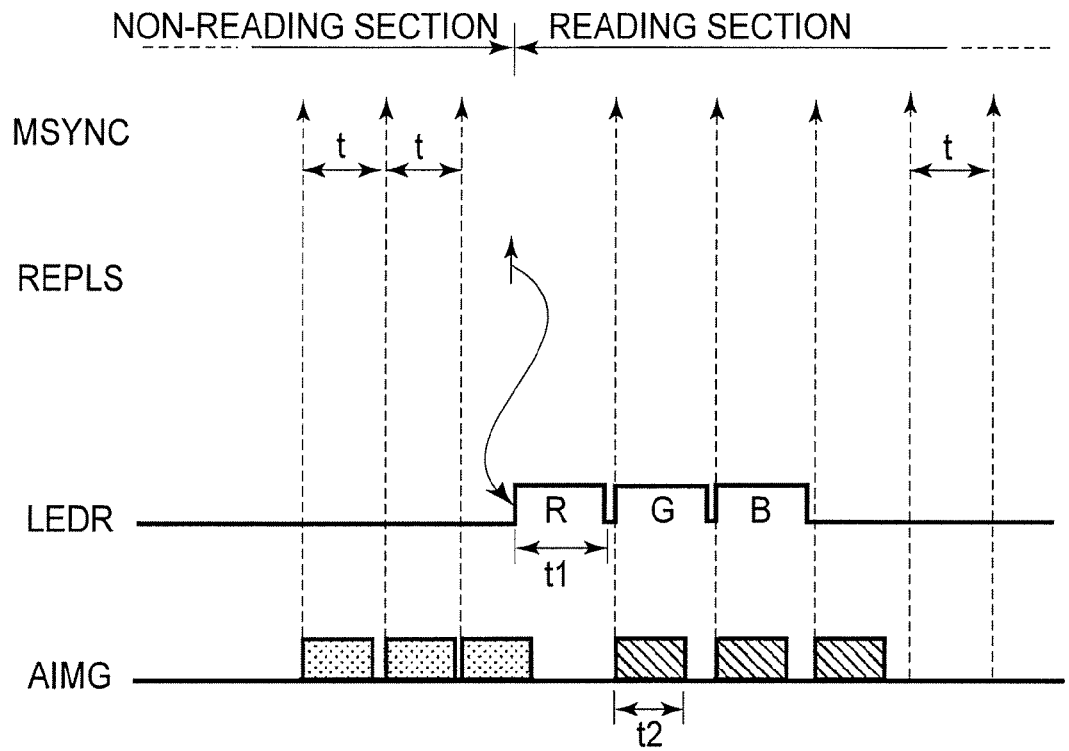
FIG. 10 is a time chart of various signals for image reading synchronized with a rotary encoder sensor output.

FIG. 10 is a time chart of various signals in the color image original reading operation. As shown in FIG. 10, the red color LED 202, the green color LED 203 and the blue color LED 204 are lit sequentially in synchronism with the one output of the pulse signal (REPLS) from the rotary encoder sensor. After the lighting, the main-scanning synchronizing signal (MSYNC) of the LIS are sequentially outputted, and in synchronism with the signal, the analog image signal for each color component is outputted. The operation is carried out continuously. In such a case, as described above, the variation in the period of the main-scanning synchronizing signal can be reduced by satisfying $t2<t<t1$ in the non-reading operation section.

In the non-reading section of the color image original, one of the following two controls may be effected.

Figure 11:
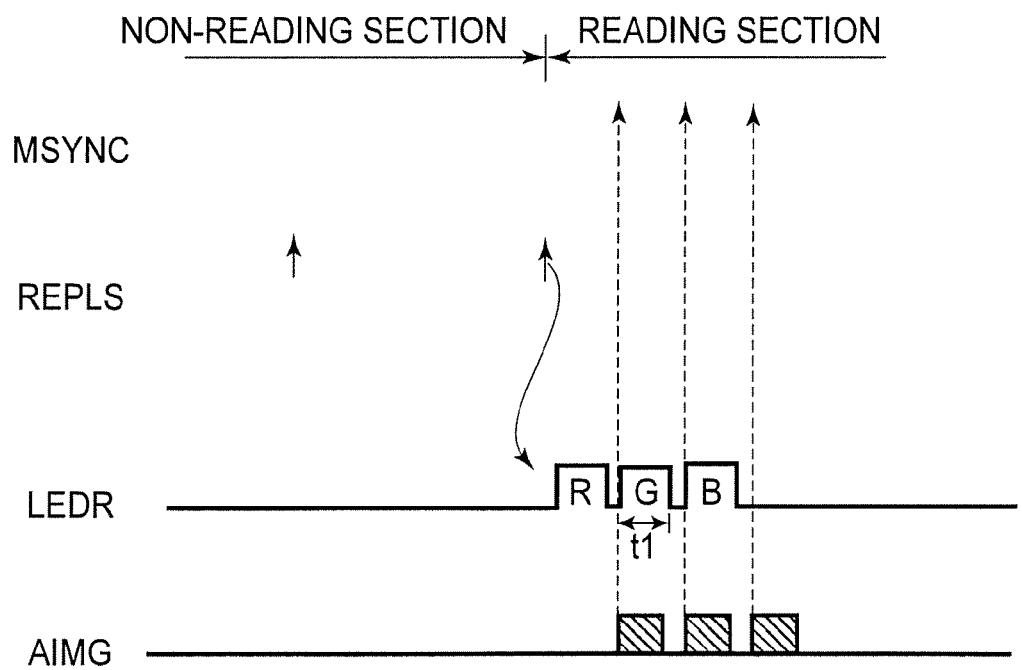
FIG. 11 is a time chart showing generation control of a main-scanning synchronizing signal in the non-reading section during color image reading operation.

FIG. 11 is a time chart of various signals in the color image original reading operation in the non-reading section. In a control shown in FIG. 11, the output of the main-scanning synchronizing signal (MSYNC) is suppressed in the non-reading section.

Figure 12:
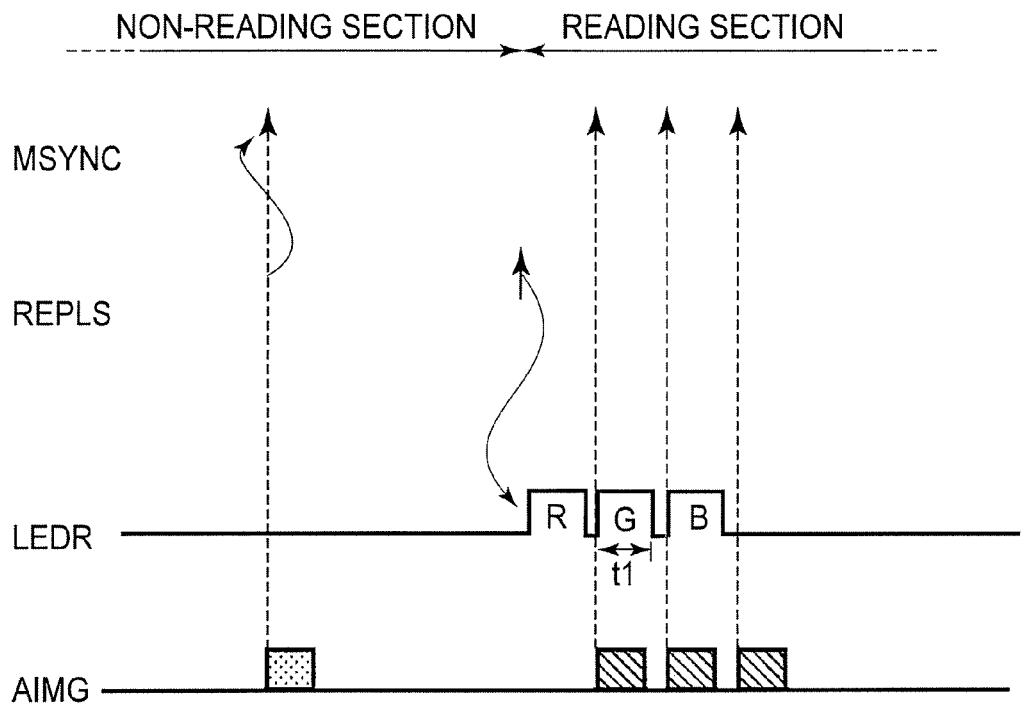
FIG. 12 is a time chart of another example of generation control of a main-scanning synchronizing signal in the non-reading section during color image reading operation.

FIG. 12 is a time chart of various signals in the color image original reading operation in the non-reading section. In a control shown in FIG. 12, the main-scanning synchronizing signal (MSYNC) is outputted in synchronism with the output of the pulse signal (REPLS) from the rotary encoder sensor in the non-reading section.

In the embodiments described in the foregoing, a DC motor is used for the driving source for moving the optical unit, but the present invention is not limited this use. For example, the driving source may be a stepping motor, and a motor driver therefor may be a driving circuit for a stepping motor.

In the embodiments described in the foregoing, the image reading position by the LIS is detected using a rotary encoder mounted to the rotation shaft of the DC motor, but the present invention is not limited to such a case. For example, a linear encoder for detecting a position of the LIS itself, or an encoder mounted to a part of a moving mechanism for moving the optical unit containing an LIS, is usable. Furthermore, in the case that image original is moved while reading the image, the linear encoder or rotary encoder mounted to the moving mechanism is usable. By this, the relative position between the image original and the image sensor can be detection.

In the embodiments described in the foregoing, the image reading is effected using an LIS having an LED light source, but the present invention is not limited. For example, a CCD linear image sensor having a reading light source and a reduction optical mechanism is usable.

In the embodiments described in the foregoing, the pulse signal from the rotary encoder sensor is used for generation of the main-scanning synchronizing signal of the LIS, but the present invention is not limited to such an example. For example, a signal provided by frequency division or multiplication of the pulse signal of the rotary encoder sensor is usable. By this, an improvement in accuracy of change of the line density in the sub-scan direction in the image original read, and/or a read with a reading line density exceeding the mechanical line density of the rotary encoder, is accomplished. In addition, with respect to the apparatus operable in a plurality of reading modes, an optimum signal can be selected in accordance with a selected reading mode by generating a pulse signal of the original or a signal provided by frequency division or multiplication of the pulse signal.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 351314/2005 filed Dec. 5, 2005 which is hereby incorporated by reference.

What is claimed is:

1. An image reading apparatus for reading an image on an original, comprising:
   reading means for optically reading the image of the original while the image is illuminated by light from a light source;
   moving means for moving said reading means relative to the original;
   position signal generating means for outputting a position signal in accordance with movement of said reading means by said moving means;
   moving control means for inputting the position signal and for controlling moving speed of said reading means by using the position signal;
   lighting control means for controlling said light source to start lighting of the light source based on output of the position signal and to end lighting of the light source after the light source lights for a first period; and
   output control means for generating a control signal for outputting an image signal corresponding to the image read by said reading means after said light source lights for the first period and for outputting the image signal for a second period in synchronism with the control signal,
   wherein the moving speed of said reading means is such that a period of the position signal is longer than the first period.

2. An apparatus according to claim 1, wherein said reading means is a linear image sensor having a plurality of pixels arranged in a direction perpendicular to a moving direction provided by said moving means.

3. An apparatus according to claim 1, wherein said moving means includes a DC motor and a motor driver for controlling said DC motor, and wherein said position signal generating means includes an encoder.

4. An apparatus according to claim 1, wherein said lighting control means and output control means effect their control operations such that the first period is longer than the second period.

5. An apparatus according to claim 4, wherein said output control means controls a period of said control signal during a period in which the reading operation of the original in synchronism with the timing signal is not carried out, to be shorter than a lighting duration of said light source.

6. An apparatus according to claim 5, wherein a period of said control signal during a period in which the reading operation of the original is not carried out is controlled to be shorter than an image signal outputting duration for one scan.

7. An apparatus according to claim 1, wherein said light source includes an LED.

8. An apparatus according to claim 7, wherein said LED includes a red color LED element, a green color LED element and a blue color LED element.

9. An apparatus according to claim 8, wherein said lighting control means lights said red color LED elements, said green color LED elements and said blue color LED elements sequentially for a predetermined duration in synchronism with the position signal.

10. An image reading apparatus for reading an image on an original, comprising:
    reading means for optically reading the image of the original while the image is illuminated by light from a light source, said reading means including a photoelectric conversion element array in which photoelectric conversion elements are arranged and a shift register;
    moving means for moving said reading means relative to the original;
    position signal generating means for outputting a position signal in accordance with movement of said reading means by said moving means;
    moving control means for inputting the position signal and for controlling moving speed of said reading means by using the position signal;
    lighting control means for controlling said light source to start lighting of the light source based on output of the position signal and to end lighting of the light source after the light source lights for a first period; and output control means for generating a timing signal for transferring electric charge accumulated in said photoelectric conversion element to said shift register after said light source lights for the first period, and for outputting the electric charge from said reading means through said shift register for a second period after the generation of the timing signal, wherein the moving speed of said reading means is such that a period of the position signal is longer than the first period.

11. An apparatus according to claim 10, wherein said output control means generates the timing signal after input of the position signal.

12. An apparatus according to claim 10, wherein said output control means, between a previous input of the position signal and a subsequent input of the position signal, generates the timing signal after the previous input of the position signal, and generates the timing signal for each elapse of the second period.

13. An apparatus according to claim 10, wherein said output control means generates periodically the timing signal at time intervals which are longer than the second period, until lighting of said light source is permitted.

14. An image reading apparatus for reading an image on an original, comprising:

reading means for optically reading the image of the original while the image is illuminated by light from a light source, said reading means including a photoelectric conversion element array which generates an electric charge, a charge storage unit which accumulates said electric charge, a gate unit which permits accumulation by said charge storage unit, and a shift register;

moving means for moving said reading means relative to the original;

position signal generating means for outputting a position signal in accordance with movement of said reading means by said moving means;

moving control means for inputting the position signal and for controlling moving speed of said reading means by using the position signal;

gate control means for controlling said gate unit to start permitting accumulation of electric charge in said charge storage unit based on output of the position signal and for controlling said gate unit to stop permitting the accumulation after a first period in a state that said light source is on; and output control means for generating a timing signal for transferring the electric charge accumulated in said photoelectric conversion element to said shift register after the light source lights for the first period, and for outputting the electric charge from said reading means through said shift register for a second period after the generation of the timing signal, wherein the moving speed of said reading means is such that a period of the position signal is longer than the first period.

15. An image reading method using a reading portion including a photoelectric conversion element array in which photoelectric conversion elements are arranged and a shift register, wherein an image of the original is optically read while the image is illuminated by light from a light source, said reading method comprising:

a moving step of moving said reading portion relative to the original;

a position signal generation step of outputting a position signal in accordance with movement, by said moving step, of said reading portion;

a movement control step of controlling movement of said reading position in said moving step by using the position signal;

a lighting control step of controlling said light source to start lighting of the light source based on output of the position signal and to end lighting of the light source after the light source lights for a first period; and an output control step of generating a timing signal for transferring electric charge accumulated in said photoelectric conversion element to said shift register after said light source lights for the first period, and of outputting the electric charge from said reading means through said shift register for a second period after the generation of the timing signal, wherein the moving speed of said reading means is such that a period of the position signal is longer than the first period.

16. An image reading method which uses a reading portion including a photoelectric conversion element which generates an electric charge, a charge storage unit which accumulates said electric charge, a gate unit which permits accumulation by said charge storage unit, and a shift register, wherein an image of the original is optically read while the image is illuminated by light from a light source, said reading method comprising:

a moving step of moving said reading portion relative to the original;

a position signal generation step of outputting a position signal in accordance with movement, by said moving step, of said reading portion;

a movement control step of controlling movement of said reading position in said moving step by using the position signal;

a gate control step of controlling said gate unit to start permitting accumulation of electric charge in said charge storage unit based on output of the position signal and of controlling said gate unit to stop permitting the accumulation after the light source lights for a first period; and an output control step of generating a timing signal for transferring the electric charge accumulated in said photoelectric conversion element to said shift register after said light source lights for the first period, and of outputting the electric charge from said reading means through said shift register for a second period after the generation of the timing signal, wherein the moving speed of said reading means is such that a period of the position signal is longer than the first period.

* * * * *